United States Patent [19]
Conwell, III

[11] Patent Number: 5,809,933
[45] Date of Patent: Sep. 22, 1998

[54] ANIMAL CLIMBING AND PERCH SYSTEM

[76] Inventor: Thomas P. Conwell, III, 10766 Pebble Ridge Dr., South Lyon, Mich. 48178

[21] Appl. No.: 648,226

[22] Filed: May 13, 1996

[51] Int. Cl.⁶ .................................................. A01K 1/035
[52] U.S. Cl. .......................... 119/28.5; 119/706; 248/235
[58] Field of Search .................................. 119/28.5, 484, 119/485, 706; 248/223.41, 235

[56] References Cited

U.S. PATENT DOCUMENTS

| | | | |
|---|---|---|---|
| D. 222,276 | 10/1971 | Hughes, Jr. ............................. | 119/706 |
| 2,579,797 | 12/1951 | Churchfield et al. .................. | 119/28.5 |
| 3,173,398 | 3/1965 | Raymond ............................... | 119/28.5 |
| 3,479,990 | 11/1969 | Crow ...................................... | 119/706 |
| 3,479,991 | 11/1969 | Lichtenberger ........................ | 119/706 |
| 3,595,209 | 7/1971 | Parker ..................................... | 119/706 |
| 3,604,397 | 9/1971 | Salerno ................................... | 119/706 |
| 3,857,365 | 12/1974 | Mueller ................................... | 119/28.5 |
| 4,047,502 | 9/1977 | Gordon, Jr. ............................. | 119/706 |
| 4,057,031 | 11/1977 | Williams et al. ....................... | 119/28.5 |
| 4,112,873 | 9/1978 | Van Zandt ............................... | 119/706 |
| 4,497,279 | 2/1985 | Bell ......................................... | 119/706 |
| 4,677,938 | 7/1987 | Tominaga ................................ | 119/421 |
| 5,002,012 | 3/1991 | Pierrot .................................... | 119/28.5 |
| 5,080,042 | 1/1992 | Rubin ...................................... | 119/706 |
| 5,275,128 | 1/1994 | Barnes .................................... | 119/706 |
| 5,351,648 | 10/1994 | Elesh ...................................... | 119/28.5 |
| 5,384,198 | 1/1995 | Hodges ................................... | 248/235 X |
| 5,474,026 | 12/1995 | Wohltjen .............................. | 119/706 X |

*Primary Examiner*—Robert P. Swiatek
*Assistant Examiner*—Elizabeth Shaw
*Attorney, Agent, or Firm*—John R. Benefiel

[57] ABSTRACT

A cat perch system has a series of carpet covered steps affixed cantilevered from a room wall, vertically spaced from each other and laterally offset, leading to one or more larger platform perches affixed to a wall or in a wall corner or so as to extend in front of a glazed opening in the wall allowing a cat to climb to the platform which may be elevated at any selected height above the floor.

14 Claims, 3 Drawing Sheets

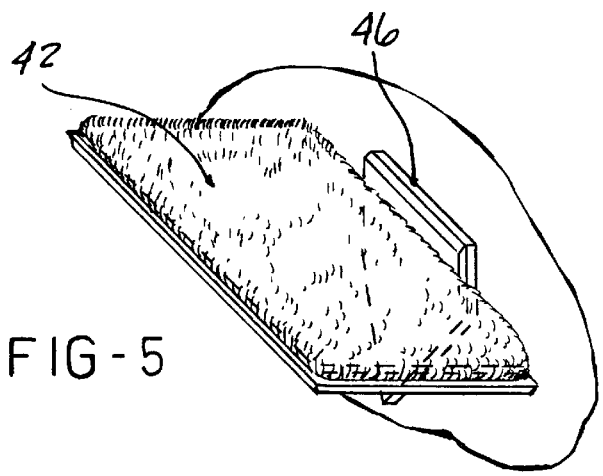
FIG-5
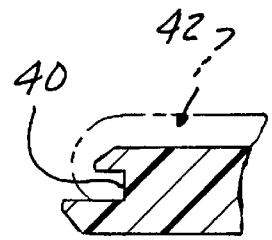
FIG-7
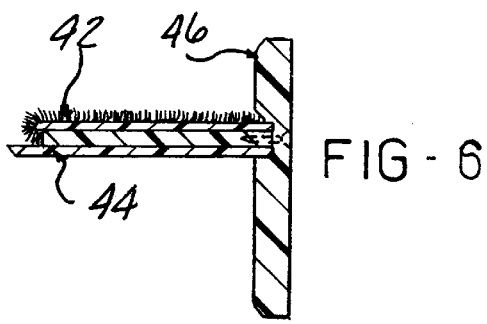
FIG-6
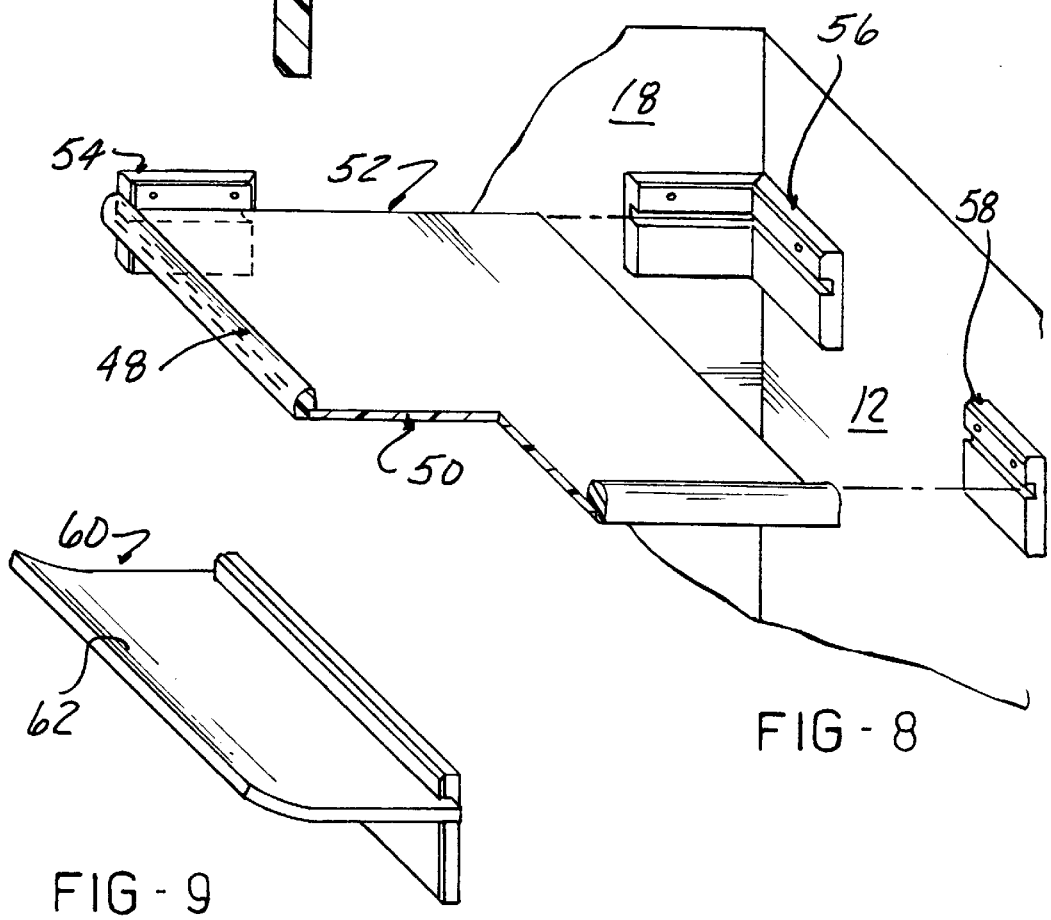
FIG-8
FIG-9

ANIMAL CLIMBING AND PERCH SYSTEM

BACKGROUND OF THE INVENTION

This invention concerns climbing structures and perches for pets and more particularly for cats. Window perches are often provided for cats as they seem to enjoy observing the out-of-doors through a window. Elevated perches also allow a place for a cat to rest without being underfoot and to escape the attention of children or other pets.

It has heretofore been proposed to provide an elevated perch which can be reached by climbing. One prior art arrangement comprises a pole on which is mounted a series of radially offset steps leading to the perch. See for example U.S. Pat. Nos. 3,595,209 and 3,479,991. U.S. Pat. No. 5,002,012 describes a carpet covered pole supporting a platform which can be climbed with the aid of a pair of widely spaced steps connected by suspension bridges connected to the steps and the platform.

Pole mounted systems consume considerable floor space and generally are in the way, and also constitute a fairly complex, costly structure, such as to be of limited practicality.

It is the object of the present invention to provide a climbing and perch system which is particularly suited to cats, which occupies minimal floor space with aesthetic appeal and is adaptable to various installations, while being greatly enjoyed by these pets.

SUMMARY OF THE INVENTION

This object is achieved by an animal climbing and perch system comprised of a series of relatively closely spaced but staggered wall mounted step platforms which lead to one or more larger perch platforms. The perch platform or platforms can comprise a corner mounted perch platform, a wall mounted perch platform, and/or a longer length wall platform having an overhung portion extending in front of a window.

The steps and perch platforms are each covered with a material which is readily engageable with the cats' claws to be grippable, such as carpeting, or at least having a high friction surface to enable a cat to ascend the steps to the perch platform by executing a series of successive jumps to each step and then to a perch platform.

Each step and perch platform may comprise a planar rigid member having a rear edge piece and a rear edge received in a slot in a mounting piece attached to a wall so that the step is cantilevered, projecting horizontally from the wall. Further adaptations may include a curved, shaped, or contoured horizontal rigid member providing additional security and comfort to the pet.

The planar support member is covered with a carpet section or other surfacing material which is securely attached. A trim border can be installed around the perimeter of the carpet piece, or alternatively the carpet edges can be wrapped around a nose contour formed about three sides of the support member.

The system resembles a shelf system so as to be aesthetically compatible with formally decorated spaces within a home, as well as less formal areas such as family rooms, etc.

DESCRIPTION OF THE DRAWINGS

FIG. 5 is a perspective fragmentary view of a supporting wall having a perch step according to an alternate construction installed thereon.

FIG. 6 is a sectional view of the perch step shown in FIG. 5.

FIG. 7 is an enlarged sectional view of a portion of the perch step shown in FIGS. 5 and 6.

FIG. 8 is a fragmentary view of a corner between two intersecting walls showing an alternate construction of a corner perch included in the perch system.

FIG. 9 is a perspective view of an alternate shape for a perch platform.

DETAILED DESCRIPTION

Figure 1:
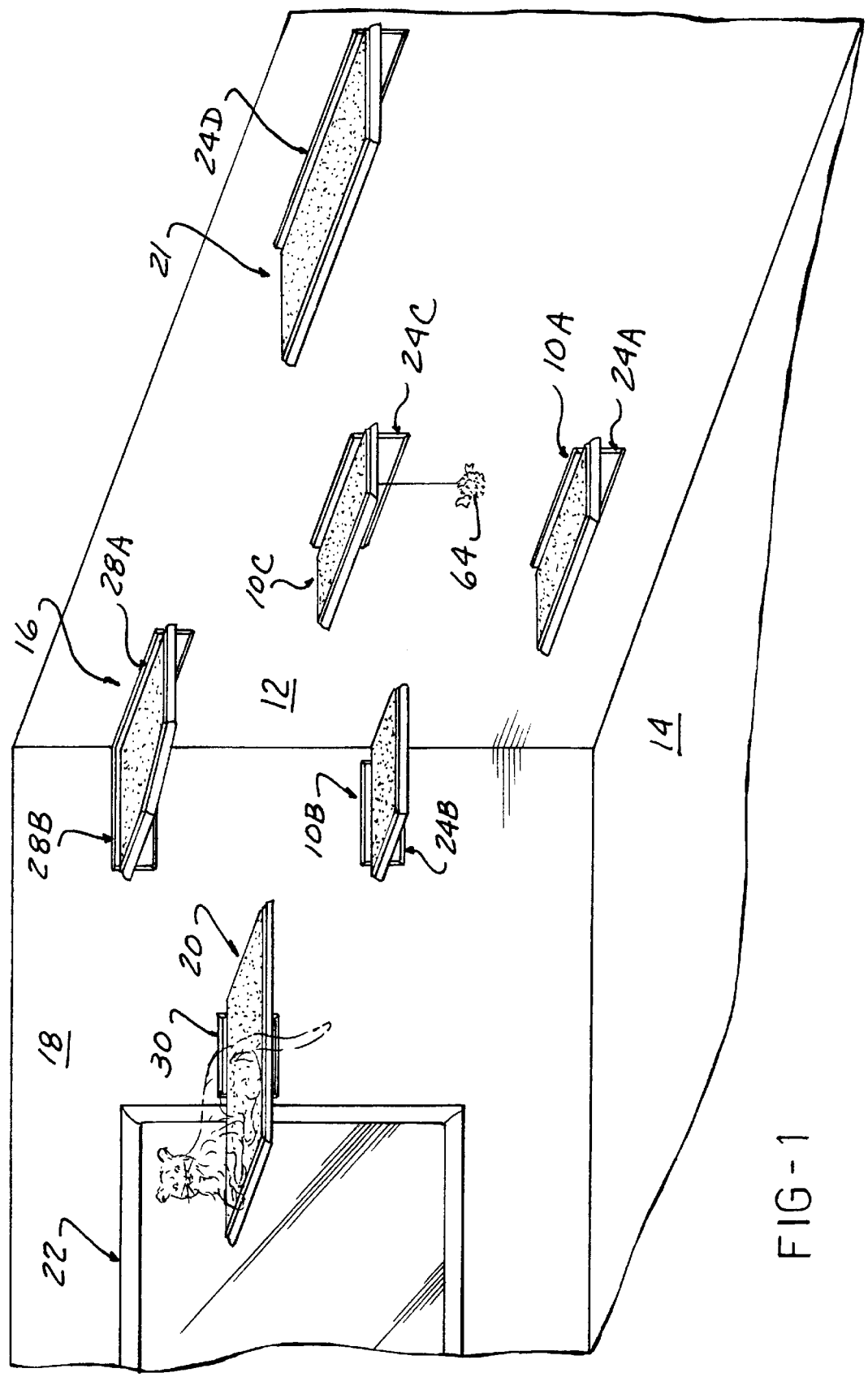
FIG. 1 is a perspective fragmentary view of two walls of a room having a climbing and perch system according to the invention installed thereon.

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Referring to the drawings, the cat climbing system according to the present invention consists of a series of perch steps 10A–10C mounted cantilevered from a building room wall surface 12, in a vertically ascending staggered array as shown. The position of the first step may vary from close to the floor or near an object such as a chair or couch to serve as a starting point for the ascent. The next step 10B is spaced above the first step 10A within easy leaping distance offset to one side to allow an easy leap from the first step 10A. The third step 10C is horizontally offset from the second step 10B and spaced above the second step a similar distance as between the lowest and second steps 10A, 10B. Although three steps are shown, any number or arrangement is possible.

Spaced above the perch steps 10A–10C is a perch corner platform 16 cantilevered from wall 12 and also from intersecting wall 18. Corner platform 16 is offset horizontally from the top perch step 10C so as to allow the cat to leap to the corner platform perch 16.

A window platform 20 is also provided cantilevered from a section of wall 18 immediately adjacent a window 22 or other glazed opening such as a doorwall intermediate the height of the window 22. The window platform 20 may be lower than the corner platform 16, although horizontally offset therefrom. The window platform 20 can be notched out to accommodate the window trim molding 19.

A wall platform 21 is mounted to project from one wall 12.

The platforms 16, 20, 21 are preferably located well above the floor, i.e., five feet or more, to provide good viewing and safety, but this can be varied.

Figure 4:
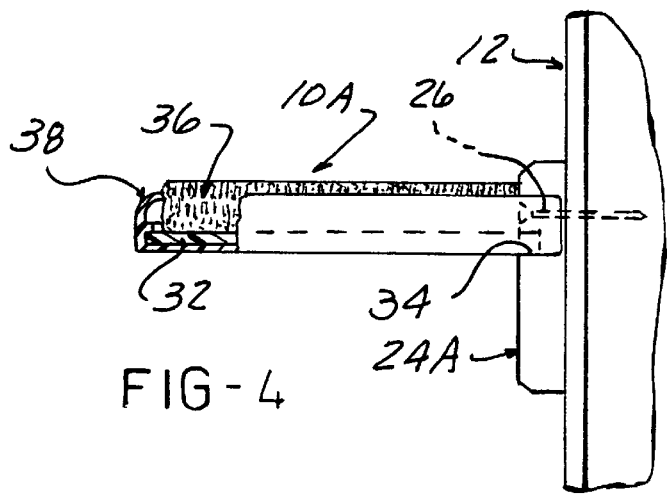
FIG. 4 is a side elevational view partially broken away of the step shown in FIGS. 2 and 3, together with a fragmentary sectional view of the supporting wall.
Figure 2:
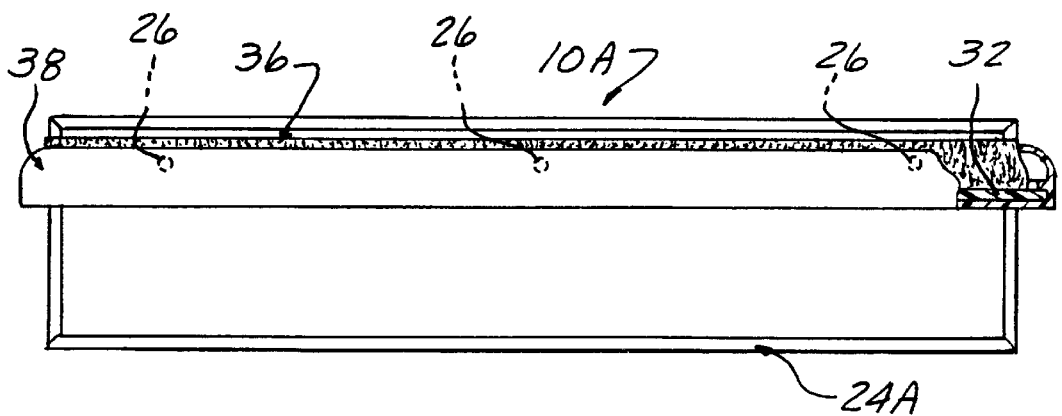
FIG. 2 is a front elevational view, partially broken away of one of the steps incorporated into the climbing and perch system of the invention.

The perch steps 10A–10C and wall platform 21 are mounted by planar supports 24A–24D fastened against the surface of wall 12, as with screws 26 (FIGS. 2 and 4).

Corner platform 16 is supported along two orthogonal edges with two full length planar supports 28A, 28B, respectively, fastened to two intersecting walls 12 and 18. The window platform 20 has a partial length support 30 so as to be cantilevered both out from the wall 18 and laterally in front of the window 22, and extending the full length of the step 10A–10C.

Figure 3:
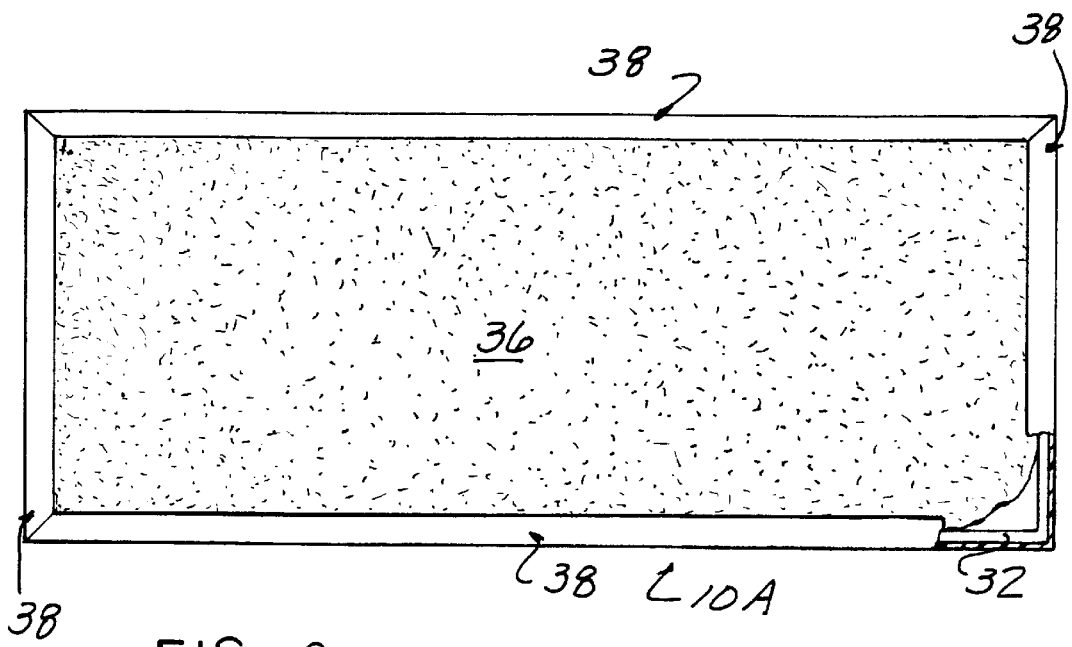
FIG. 3 is a plan view partially broken away of the step shown in FIG. 2.

FIGS. 2–4 show the constructional details of the lowest perch step 10A, but the construction shown is typical for each of the steps 10A–10C and the platforms 16, 20 and 21.

The planar support 24A may be comprised of a solid wood board, a section of plywood or plastic composite material, shown extending the full length of the step 10A. A beveled edge improves the appearance.

The step 10A is comprised of a stiff structural rectangular member 32, such as ⅛ inch hardboard which has its rear edge received in a slot 34 routed into the outer surface of the support 24A and retained with a suitable adhesive.

The upper surface of member 32 is overlain with a rectangular section of carpet 36 to provide a surface which is readily penetrated to be gripped by the cat's claws. The carpet section 36 can be secured with double faced tape, adhesive, or other suitable means. Mitered sections of an extruded plastic edge trim piece 38 has a channel portion received onto the exposed edge of the member 32, with a coved upper portion extending above the surface of the sheet 32 to conceal the edges of the carpet section 36.

The screws 26 are located below the level of the carpet surface and will be installed prior to the carpet section 36 so as to be concealed when the carpet section 36 is installed, as indicated in FIG. 2.

The steps 10A–10C may be of smaller size than the platforms 16 and 20, i.e., approximately 6×15 inches. Corner platform 16 may be on the order of 17 inches on each side, while a window platform 20 or wall platform 21 typically would be on the order of 8×15 inches.

It should be understood that the above embodiment is merely exemplary, as considerable variations in the size, construction details, and arrangement on the wall are possible.

For example, any combination in the number of climbing steps and climbing perches may be used.

FIGS. 5–8 show examples of alternate construction. In FIGS. 5–7, a routed channel 40 on three sides creates a recess into which a carpet section can be wrapped. A generally triangular support 44 of a plywood or board piece 44 is adapted to be mounted to the wall.

FIG. 8 shows the use of mitered quarter round molding sections 48 as a carpet trim border rabbeted to receive the edge of a hardboard sheet 50. The construction shown above a corner platform 52, and three separate supports 54, 56, 58 are used. Straight supports 54, 58 have grooves receiving respective edges of the hardboard sheet 50 which are glued thereto.

The corner support 56 remains unattached to allow shifting to accommodate any out-of-square condition of the corner formed by the intersection of walls 12, 18.

FIG. 9 shows a curved form of a platform perch 60 in which the outer edge 62 is curved to create a security border tending to confine the animal using the perch and reduce the chance of rolling off the platform.

Toys 64 may be hung from beneath a platform or step. Food bowls 66 can be stowed on a platform safety out of reach of other pets or children.

The above arrangement is versatile and allows great latitude in setting up a system to suit a particular pet and room layout. The wall mounting can be adapted to high ceilings which could not be accommodated by pole systems.

I claim:

1. An animal climbing and perch system mounted to a room wall surface within a building, said system comprising:

a vertically ascending array of horizontal perch steps, and mounting means mounting each step to said wall surface to be cantilevered out therefrom;

said perch steps being vertically spaced apart from each other;

each of said steps being horizontally offset from immediately adjacent steps in said ascending array;

a horizonal perch platform and mounting means mounting said perch platform to said room wall surface to be cantilevered therefrom and spaced above the highest perch step in said ascending array, whereby said perch steps allow a cat to climb along said perch steps to said perch platform by executing a series of upward leaps from perch step to perch step and to said perch platform.

2. The climbing and perch system according to claim 1 wherein said perch steps and said perch platform are each covered with a claw penetrable material.

3. The climbing and perch system according to claim 1 wherein said building room has orthogonal meeting wall surfaces forming an inside corner, and wherein said perch platform comprises a generally planar piece having orthogonal edges forming an outside corner, each edge mounted to a respective orthogonal room wall surface.

4. The climbing and perch system according to claim 1 wherein said perch platform comprises a generally planar rectangular piece attached to a room wall surface and cantilevered laterally to extend in front of a glazed opening in said room wall surface.

5. The climbing and perch system according to claim 2 wherein said perch steps and said perch platform each include a rigid sheet member overlain by a carpet section comprising said claw penetrable material.

6. The climbing and perch system according to claim 5 wherein said rigid sheet member of each perch step and said perch platform has edges each bordered by a respective trim piece fixed to an edge to define a border around said carpeting.

7. The climbing and perch system according to claim 6 wherein said trim piece fixed to an edge has a groove receiving a mating member edge.

8. The climbing and perch system according to claim 1 including mounting means comprising a respective generally planar perch step and perch platform wall support piece for each perch step and perch platform having a groove receiving an edge of an associated perch step or perch platform.

9. The climbing and perch system according to claim 8 wherein each respective step support piece extends completely along one side of a respective perch step.

10. The climbing and perch system according to claim 9 wherein said perch platform has two orthogonal edges forming a corner, and wherein two of said wall support pieces each have a groove receiving a respective orthogonal edge of said perch platform and are each attached to a respective one of two intersecting room wall surfaces.

11. The climbing and perch system according to claim 10 further including a right angled corner support piece grooved to be slidably fit to both edges of said perch platform.

12. The climbing and perch system according to claim 1 wherein three platform perches are included in said system, a corner perch platform attached to intersecting room wall surfaces, and a window perch platform attached to a room wall surface adjacent a glazed opening therein, and having a portion extending in front of said glazed opening, and a wall perch platform attached to a room wall surface.

13. The climbing and perch system according to claim 1 wherein said perch platform is elevated five or more feet above the floor.

14. The climbing and perch system according to claim 1 wherein said perch steps are each being on the order of six inches in width by fifteen inches in length.

* * * * *